May 17, 1955  J. L. BERNARD, JR., ET AL  2,708,686
TRANSMISSION LINES AND SUPPORTING MEANS THEREFOR
Filed Nov. 1, 1949                                      2 Sheets-Sheet 1
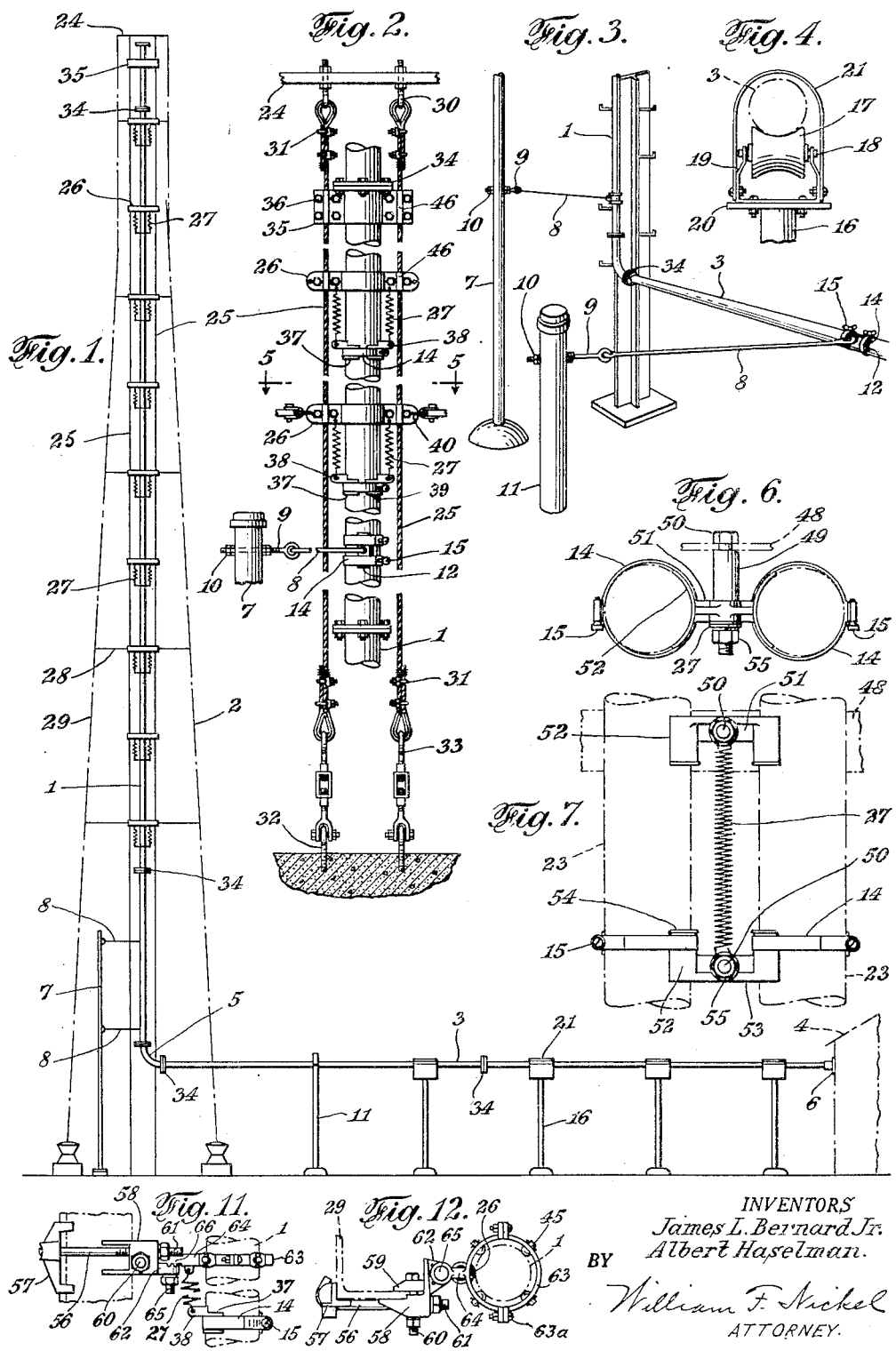
INVENTORS
James L. Bernard Jr.
Albert Haselman.
BY William F. Nickel
ATTORNEY.

May 17, 1955 J. L. BERNARD, JR., ET AL 2,708,686
TRANSMISSION LINES AND SUPPORTING MEANS THEREFOR
Filed Nov. 1, 1949 2 Sheets-Sheet 2

INVENTORS.
James L. Bernard Jr.
Albert Haselman.
BY
William F. Nickel
ATTORNEY.

United States Patent Office 2,708,686
Patented May 17, 1955

2,708,686

TRANSMISSION LINES AND SUPPORTING MEANS THEREFOR

James L. Bernard, Jr., Eatontown, and Albert Haselman, Union, N. J.

Application November 1, 1949, Serial No. 124,844

6 Claims. (Cl. 174—41)

Our invention is an improvement in transmission lines and means for supporting them, especially coaxial transmission lines for carrying electrical energy in radio communication and in the production of television effects.

An important object of the invention is to provide means for installing and supporting a transmission line in such a manner as to eliminate risk of damage to it as a result of changes in temperature; by leaving it free to expand and contract upon a rise and fall in temperature, and at the same time bracing it against the action of high winds. Hence the line can be utilized at full efficiency at all times and under all conditions.

Another object of our invention is to provide a transmission line entailing the expenditure of a minimum of time and labor for installation, requiring few accessories to complete the task and of such design that the method of setting it up can be easily and quickly performed.

To mount a transmission line or part thereof on an elevated structure, the line must receive proper mechanical support along its entire length to resist wind loads and vibration. Also the line must be suspended so as to be able to move in response to direct or differential expansion between the line itself and the supporting structures.

When the line is erected, not only are devices needed for actually holding the transmission line in place throughout its course from transmitter building to antenna; but also the forces producing thermal expansion and contraction resulting from climatic temperature changes or electrical loss in the line itself must be taken into account. Otherwise such forces may tear the best system apart. During contraction, the horizontal section of the line might break the end seal in the transmitter building, pull the vertical section of line from its brackets, open flanges or other couplings between sections of line and render the system inoperative or produce faulty performance. Upon a rise in temperature the line expands and may produce buckling, unsafe tower stresses or damage to itself and the supporting structure; thus necessitating a shutdown of the station for minor or major repairs.

Since an object of this invention is to relieve all stresses throughout a transmission line system and permit the line to move both horizontally and vertically to a sufficient extent, clamping or supporting guide members are employed to give a slipping or rolling engagement with the line; allowing virtually frictionless movement, yet giving adequate support to the line. Thus the line can expand and contract with temperature changes to the necessary degree. Springs suspend the entire vertical section and yield whenever vertical movement ensues. Construction suited to a variety of tower or other structures of various types, shapes and sizes is feasible, and no expansion joints are present or necessary.

On the drawings:

Figure 1 is a side elevation of a tower and the supported transmission line, showing the vertical run of line spring suspended from vertical cables, and the horizontal run supported by rollers;

Figure 2 is an elevation showing supporting or "messenger" cables and the manner in which the rising or vertical section of the line is hung upon the cables;

Figure 3 is a detail in perspective illustrating how the junction of the two sections is made;

Figure 4 is an end view of one of the hooded rollers on which the horizontal section rests;

Figure 6 illustrates in top plan a method of mounting the rising parts of dual transmission lines by means other than cables;

Figure 7 is a side view showing such means;

Figures 11 and 12 are respectively side and top views to show how the rising part of the line can be engaged by slip clamps connected directly to the tower or other supporting structure;

Figure 19:
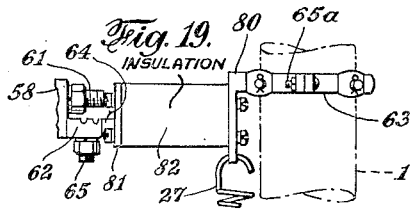

Figures 13 and 14, 15 and 16, 17 and 18 respectively, are similar views showing different devices for mounting the rising section of the line by means of guide members and suspension springs directly united to the tower or other supporting structure;

Figure 19 shows how the line can be insulated from the tower or other supporting means.

Referring to Figure 1, the transmission line system comprises a vertical or rising section and/or a horizontal section, the former being indicated at 1 suspended on the framework of a tower or other supporting means 2; and the horizontal section 3 leading from the transmitter building 4. As will appear later, the section 1 may rise at an angle other than a right angle to the section 3. The two sections are united by an elbow 5. The transmission line consists of a tubular or other cross sectional conductor which may be made of copper or other suitable metal within an outside casing of copper or other suitable metal. The horizontal section 3 is united to the wall of the building 4 by means of a flange 6. Adjacent the junction 5 of the rising section 1 and the horizontal section 3 is a steel pipe or other suitable support 7 secured to the section 1 by lateral braces 8, comprising rods with their ends attached to eye bolts 9, shown in Figure 3. The latter may pass through the post 7 and are made fast by nuts and washers 10 on both sides of the post 7. Near the bend or elbow 5 is a shorter steel pipe or other suitable support 11, shown in Figure 3, to which the horizontal section 3 is connected by a brace 8. The opposite extremities of the rods of braces 8 are secured to eyelets affixed to curved plates 12 made fast by straps or clamps 14 which encircle the outer casing of the transmission line and are secured in place by means of adjusting and tightening screws 15 shown in Figures 2, 3 and 6 passing through the usual threaded fittings, lugs or ends of the rings 14.

Referring to Figures 1 and 4, between the post 11 and the building 4 the horizontal section of the line is held up by steel pipes or posts 16 at the tops of which are rollers 17 of impregnated and varnished hard wood or other suitable material with trunnions or shafts 18 of metal projecting from the opposite ends and passing through openings in the arms of U-shaped brackets 19.

These members 19 are fixed to plates 20 on the upper ends of the posts 16 and to the outsides of the members 19 near the plates 20 are affixed bent plates 21 that form protecting hoods for the rollers 17. The latter are so shaped that the sheath or casing of the section 3 of the transmission line fits the rollers 17 upon which the transmission line rests.

Figure 5:
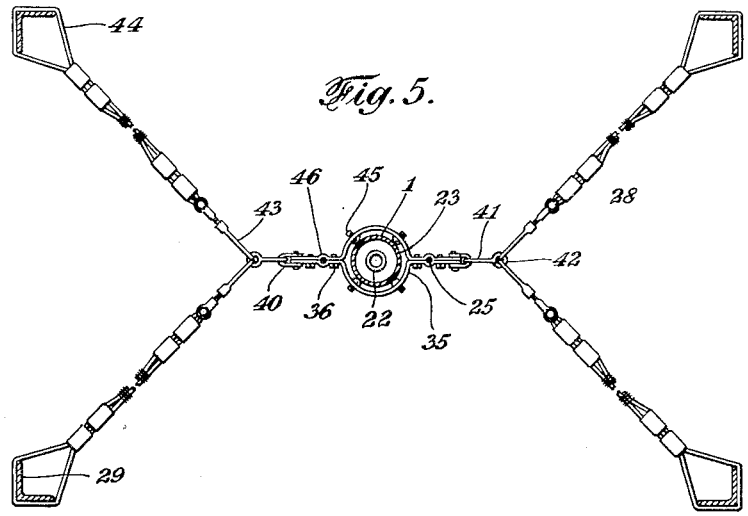
Figure 5 is a plan view of the horizontal brace members between the vertical "messenger" cables and the legs of the tower or other supporting means, seen from the plane of line 5—5 in Figure 2.
Figure 8:
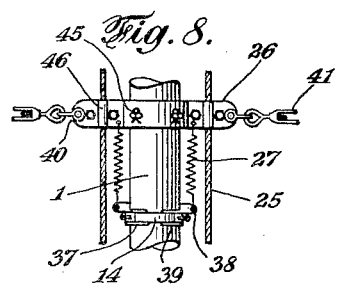
Figure 8 is a side view of one of the guide members and associated springs and clamps used with the construction shown in Figure 2.

Referring to Figures 1, 2 and 5, the inner conductor of a tubular shaped transmission line is indicated at 22 and the outer casing at 23 and at the top of the tower or other supporting structure is a fixed horizontal plate or member 24, above which the antenna is usually located and to which both the inner conductor 22 and the outer casing 23 are led and connected to the antenna in the usual manner. Beside the section 1 of the line are the upright supporting or "messenger" cables 25 of steel, upon which the section 1 or rising portion of transmission line is hung by means of guide members or slip clamps 26 and springs 27 and other parts to be presently described.

Springs 27 shown in several figures are affixed at their lower ends to the transmission line and at their upper ends to the fixed members such as 26 which are here called slip clamps or guide bands or members and which encircle the sheath 23 of the transmission line and allow unrestricted axial motion of the sheath therein. The members 26 are in turn fastened tightly to the cables 25, at points several feet apart along section 1 of the line. Good clamping action is obtained with these members by shaping the clamps 26 to fit snugly around the messenger cable as shown at 46 in Figure 5. These slip clamps are also attached, by horizontal braces or guys 28, to the legs 29 of the tower or other support. Therefore, the section 1 of the line which is affixed at its upper end to the tower is free to expand or contract downward and upward and the horizontal run 3 can expand and contract between the tower 2 and the building 4 along the rollers 17 or other anti-friction means. Such movement of the two sections 1 and 3 causes bending of the line at the junction 5 and adjacent parts as the temperature falls or rises. Such bending may take place in as much as 50 feet along the vertical run of line and 40 feet along the horizontal run. This "hinge" action in which the two arms of transmission line are gently bent to accommodate the "come and go" in the system with temperature changes is sufficient to relieve substantially all stresses in the system. The stress produced in the transmission line represented by the "hinge" is negligible as the bend in the line per unit of length is infinitesimally small.

The antenna top plate 24 carries fixed eye bolts 30 and the ends of the cables 25 are looped through these bolts and made fast by means of U-shaped clips 31 which envelope the doubled over ends of the cables. At the lower ends of the cables 25 are eye bolts 32 set in concrete and joined to the adjacent extremities of the cables, which are doubled over and held as before by clamps 31. By turnbuckles 33, the cables 25 can be drawn taut. The cables may also be anchored at their lower ends by eye bolts to parts of the tower or other supporting structure with insulators between the metal cables and the tower where required. Beneath the top plate 24, the casing of the transmission line has a flange 34. Encircling the casing just below this flange and making contact with or out of such contact is a clamp 35 which is rigidly fastened to the cables 25 and to the casing 23. This clamp consists of two plates secured together by screws 36. It grips the casing 23 tightly, and also grips the cables 25, being semi-cylindrical in the middle and with matching grooves at the ends in order to effectively accomplish the clamping action. The section 1 of the line, consisting of inside conductor 22 and the outer casing 23 is thus anchored to and suspended from the upper part of the tower. Any expansion is from the top down. It is of course understood that the casing is in sections of suitable length having flanges 34 at the adjacent ends of the pieces or sections for bolting the sections together.

Below the anchor clamp 35 are the guide members or slip clamps 26 fixed to the messenger cables 25 and encircling the casing without gripping it in order to permit movement of the line therein when the temperature changes. To the members 26 the springs 27 are affixed at their upper ends. Their lower ends are joined to semi-circular or otherwise formed clamps 37 of metal which have perforated projections 38 through which the springs are hooked. These clamp pieces are held fast upon the casing 23 by bands or straps 14 secured by adjusting or tightening screws 15, these straps fitting into the pieces 37. Members 26 cannot move, but as the line expands or contracts the pieces 37 move with it and the springs 27 are stretched or eased accordingly. Grooves 39 in the clamping pieces 37 receive the straps 14, thus making a strong though adjustable assembly by means of which the springs may be attached to the transmission line sheath.

The installation as thus described, being what is known as an "indirect attachment" system with the horizontal section 3 rigidly secured to the building 4 at the anchor clamp 6, and the section 1 suspended by means of the anchor clamp 35 at the top of the tower 2; the two sections having the junction 5; enables the line to expand or contract to the fullest extent as the temperature rises or falls. The section 1 expands and contracts lengthwise and downward from the anchor clamp 35, and the section 3 horizontally between the building 4 and the tower 2. When the section 1 expands downward, the section 3 grows longer also, forcing the connection 5 to the left and downward. The length of the section 1 from the elbow 5 up to the first slip clamps or guide members 26 will now bend sideways to a sufficient extent. Also as the section 1 expands the portion of the section 3 between the tower and the nearest post 16 will bend slightly downward. In warm weather the angle between the two sections at the elbow 5 will be smaller; and in cold spells, when contraction ensues, the same angle will be larger. The fixed clamp 35 and cables 25 bear the weight of the upper part of the line and the remainder of the weight is carried by the springs 27 and clamp members 26. Thus the total weight is nicely distributed.

When such movements of the two sections occur, the section 3 slides easily on the rollers 17, and the section 1 slides in the guide members 26, stretching or easing the springs 27. A very long line can be erected in this way and operated perfectly at all seasons and in all weather.

The horizontal braces 8 attached to the posts 7 and 11 can of course move with the line, while the posts remain rigid. They do not restrict the line as it expands and contracts; but they hold it against the lateral pressure of heavy winds.

The horizontal braces or guys 28 for the members 26, Figure 5, comprise shackles 40 affixed by bolts and nuts to the plates of said members at both ends. Links or other suitable fittings 41 connect the assembly to rings 42, the latter being joined by separate lines including links 43, cables and other parts, with insulators if needed, to the legs 29 of the tower, such cables being looped around the legs as indicated at 44 on Figure 5. The links 41 may be omitted and the parts or links 43 can have the form of turnbuckles attached directly to the rings 42.

Turnbuckles can also be included at selected points, wherever desired, so that the members 25 can be centered in the tower or other supporting means. The cylindrical middle parts of the two plates of the members 26 have rounded Bakelite or other suitable projections 45 inside, which make a contact with the casing 23 of the section 1.

Figure 9:
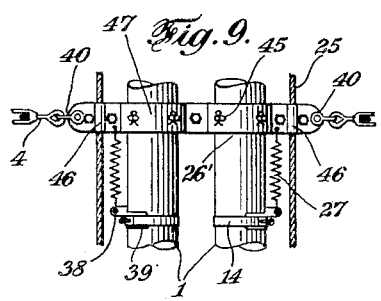
Figure 9 is a similar view of the same parts for the rising sections of dual transmission lines hung upon cables.
Figure 10:
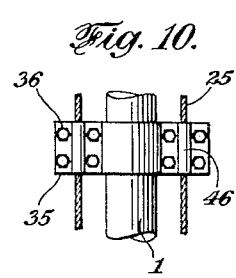
Figure 10 shows a clamp for rigidly engaging the rising part of the line near its upper end.

When dual lines are suspended, slip clamps 26' can be shaped as shown in Figure 9, being formed to the proper radius or shape in two places as illustrated at 47 for passage of the outer casings of the line. These clamps may then be bolted together in the middle and at opposite ends. One saddle piece 37 may be used for each transmission line casing, held as before by straps 14. Springs 27 may be attached to the clamping or saddle pieces 37 and the adjacent ends of slip clamps 26' as with single transmission line installations. In much the same manner several transmission lines may be suspended with equally successful results.

The semi-cylindrical portions of the members 26 and 26' around the casings 23 thus form encircling guides for the casing 23 of the section 1 of the line; and the round Bakelite inserts 45 can be affixed in any suitable way. They may have projections extending out through holes in the members 26, with cotter pins through said projections on the outside of said members.

The cables 25 can be attached at their upper ends to the top plate 24 of the tower and at their lower ends to a concrete bed upon the ground beneath the tower, as already set forth. They can also be hung up by affixing both upper and lower ends to any metal part of the support structure, by means of shackles or any other suitable devices, and interposing insulators between the cables and said fasteners where required; and they can be engaged between their ends by means of clamps gripping the legs or other horizontal members of the support structure, said members also having arms branching therefrom which are attached to the cables by clips such as are shown at 31. In any case, the cables will carry the clamp 35 at the top upon which the line is hung and below this point at a distance of a few feet between them will be the tubular guides 26 through which the line passes and from which it is hung upon the springs 27.

Our invention is not limited to one particular means for properly applying transmission lines to supporting structures in order to gain the advantages of freedom of motion and distribution of weight for the system as a whole or parts thereof. That is, the transmission line need not be suspended upon cables but other devices may be used for attaching the line to structures from which it derives support. Several types of devices for this purpose are illustrated in Figures 6, 7, 11 to 19, inclusive. Each of these includes a clamping member to be affixed to the tower or supporting structure with an arm extending from the clamp and carrying a guide or slip ring somewhat like the member 26, with Bakelite projections inside. The guiding member characteristic of these "direct attachment" devices surrounds the casing 23 of the line and allows the casing to slide freely through it when expansion or contraction takes place, in much the same manner as provided by the other type slip clamp assembly 26 which is known as an indirect attachment to tower or other support.

Among the assorted "installation hardware" products made use of in connection with our invention are those illustrated in Figures 11 and 12 showing a hook 56 which engages at one end a heel plate 57 shaped to fit the corner of the angle-shaped leg 29 of the tower or other structure. The opposite end is threaded for a nut to hold it united to clamp jaw 58. Cooperating with the jaw 58 is another jaw 59 secured thereto by a bolt and nut 60, the bolt extending through both jaws, which grip one web of the leg 29. When the bolt 60 and the nut on the threaded end 61 of the hook 56 are tightened, the unit is held fast on the leg 29. The jaw 58 also has a notched lug 62 for the attachment of a similarly notched arm 64 having half of an integral ring 63 at its outer end, the ring bearing Bakelite buttons 45 on its inner face. This ring forms a guide member similar to members 26. This ring may be in two halves, one of which is integral with the arm 64, and the other is fastened to the first half by bolts and nuts 63a. To a perforated lug on the arm 64 is attached one end of a spring 27, connected as above described to the casing of the line 1. The end of the arm 64 has teeth on the lower side 66 engaging teeth on the face of the lug 62, so that the arm 64 and the member 63 can be held in adjusted position. The teeth 66 are preferably radial and the arm 64 is affixed to the lug 62 by a bolt 65.

Figure 13:
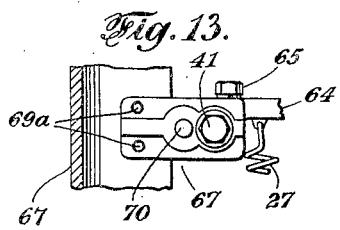
Figure 14:
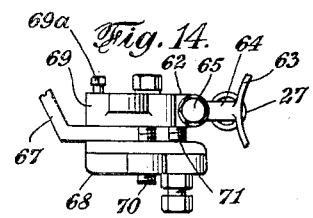

The Figures 13 and 14 show the same arm 64 with a guide member (again two halves) at one end and adjustably secured by a bolt and nut 65 to a lug 62 on a clamp which is affixed to one web of an angle iron leg 67 of the support. The clamp includes two jaws 68 and 69 held together by bolts 70 and 71, which cause the clamp to grip the leg tightly. Also two set screws 69a lock jaws 68 and 69 firmly to the supporting member.

Figure 15:
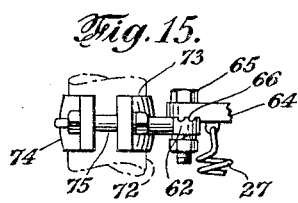
Figure 16:
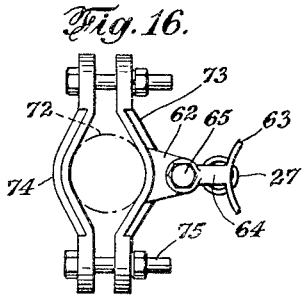

Figures 15 and 16 show a round leg 72 of the tower or supporting means. The arm 64, carrying the member 63 in joined semi-circular halves, is secured as before by a bolt 65 to a lug 62 on one jaw of a clamp member 73. In conjunction with a similar member 74, the clamp assembly is made fast to the round tower section by bolts and nuts 75.

Figure 17:
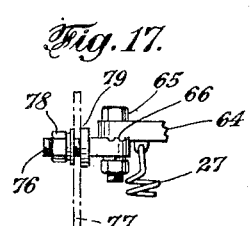
Figure 18:
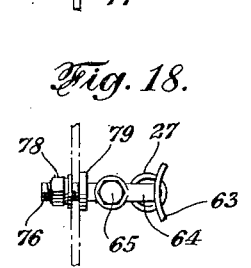

In the device of Figures 17 and 18 the arm 64 with one half of the guide member 63 and spring 27 is shown secured by a bolt 65 to one end of a threaded stud 76, which is passed at one end through an aperture in a flat member 77 and made fast with a nut 78. The stud bears a flange 79 between which and the nut the flat member is gripped.

Figure 19 shows a plate 80 to which the half of member 63 is affixed and another plate 81 from which the arm 64 extends. Between the two plates is an insulator member 82. The arm 64 is affixed as before by a bolt 65 to a lug 62 which can be part of any of the clamps already described for engaging a leg or other support member to hold the clamp in place.

Figures 6 and 7 show dual transmission lines supported on a part 48 of a tower 1 or other support structure by means of units each of which includes a brass sleeve 49. A bolt 50 passes through the part 48, the sleeve 49, and a crosspiece 51, which is of bronze with concave ends 52, held in place by a nut 55 on the bolt 50. The concave ends of the cross piece are lined with asbestos and provide seats for the sides of the two casings 23. Below is a similar cross piece member 53 of brass or bronze with similar concave ends 52 and flanges 54 along the upper edges like the flanges 39. The ends 52 of cross piece 53 are encircled by split stainless steel clamps 14, held by bolts 15. Through a center hole in the piece 53 another bolt 50 is inserted and a nut 55 holds the looped lower end of the spring 27 in engagement with this bolt 50. The upper end of the spring is similarly secured to the upper bolt 50 by the nut 55 thereon. This spring as before allows upward and downward movement of the line, which slips at the ends 52 of the member 51.

In all of the "direct attachment" as differentiated from the "indirect attachment" devices described it will be noted that the same principle pervades our concept of a system for supporting a transmission line, namely, that slip clamps, spring suspensions, rollers and loosely held sway braces all combine to yield a substantially friction free, and otherwise unrestricted "cradle" for the transmission line which gives it full support but at the same time provides for thermal expansion and contraction.

Having described our invention, what we believe to be new is:

1. A transmission line comprising a rising section, means for supporting said section in elevated position comprising a fixed member from which the section is suspended adjacent the upper end thereof, guide members for said section at separated points, lateral braces connected to said guide members and said supporting means, suspension springs connected to said section and said guide members, a horizontal section united to the rising section at the lower end thereof, and means comprising movable braces connected to said sections adjacent the junction thereof, said supporting means for the rising section comprising cables fixed at their upper and lower ends, the upper parts of said cables being secured to said member.

2. A transmission line comprising a rising section, means for supporting said section in elevated position comprising a fixed member from which the section is suspended adjacent the upper end thereof, guide members for said section at separated points, lateral braces connected to said guide members and said supporting means, suspension springs connected to said section and said guide members, a horizontal section united to the rising section at the lower end thereof, and means comprising movable braces connected to said sections adjacent the junction thereof, said supporting means for the rising section comprising cables fixed at their upper and lower ends, the upper parts of said cables being secured to said member, said guide members having portions engaging the rising section.

3. A transmission line comprising a rising section, means for supporting said section in elevated position comprising a fixed member from which the section is suspended adjacent the upper end thereof, guide members for said section at separated points, lateral braces connected to said guide members and said supporting means, suspension springs connected to said section and said guide members, a horizontal section united to the rising section at the lower end thereof, and means comprising movable braces connected to said sections adjacent the junctions thereof, said supporting means for the rising section comprising cables fixed at their upper and lower ends, the upper parts of said cables being secured to said member, said supporting means also comprising a tower, said guide members having portions engaging the rising section.

4. A transmission line comprising a rising section, means for supporting said section in elevated position comprising a fixed member from which the section is suspended adjacent the upper end thereof, guide members for said section at separated points, lateral braces connected to said guide members and said supporting means, suspension springs connected to said section and said guide members, a horizontal section united to the rising section at the lower end thereof, and means comprising movable braces connected to said sections adjacent the junction thereof, said supporting means for the rising section comprising cables fixed at their upper and lower ends, the upper parts of said cables being secured to said member, said guide members having portions engaging the rising section, said supporting means also comprising a tower having legs, said lateral braces connecting said members to the legs of the tower.

5. A transmission line comprising a rising section, means for supporting said section in elevated position comprising a fixed member from which the section is suspended adjacent the upper end thereof, guide members for said section at separated points, suspension springs connected to said section and said guide members, a horizontal section united to the rising section at the lower end thereof, and means comprising movable braces connected to said sections adjacent the junction thereof, said supporting means for the rising section comprising cables fixed at their upper and lower ends, the upper parts of said cables being secured to said member, said guide members having portions engaging the rising section, said supporting means also comprising a tower, and connections between the tower and the guide members, said connections having the form of clamps carrying said guide members and affixed to parts of the tower.

6. A transmission line comprising a rising section, means for supporting said section in elevated position, said means comprising upright cables and a fixed member at the top of said means to which said cables are attached adjacent the upper ends thereof for suspending said section, guide members for said section spaced apart below said fixed member, a horizontal section connected to the rising section at the lower end of the latter and supporting means for said horizontal section and movably engaged thereby to permit longitudinal movement of the horizontal section, said guide members comprising parts engaging said rising section and gripping said cables.

References Cited in the file of this patent

UNITED STATES PATENTS

| Number | Name | Date |
|---|---|---|
| 286,397 | Devlin | Oct. 9, 1883 |
| 1,685,622 | Anderson | Sept. 25, 1928 |
| 2,166,237 | Cushman et al. | July 18, 1939 |
| 2,191,071 | Duttera | Feb. 20, 1940 |
| 2,251,530 | Thorne | Aug. 5, 1941 |
| 2,369,534 | Cohen | Feb. 13, 1945 |
| 2,439,067 | Wood | Apr. 6, 1948 |
| 2,447,830 | Wood | Aug. 24, 1948 |
| 2,574,309 | Wood | Nov. 6, 1951 |